US010228603B2

(12) United States Patent
Koo et al.

(10) Patent No.: US 10,228,603 B2
(45) Date of Patent: Mar. 12, 2019

(54) ELECTRO-CHROMIC PANEL CAPABLE OF SELECTIVELY MAKING TRANSPARENT AREA AND REFLECTIVE AREA AND METHOD OF OPERATING THE SAME, AND DISPLAY APPARATUS INCLUDING THE SAME AND METHOD OF OPERATING DISPLAY APPARATUS

(71) Applicant: Samsung Electronics Co., Ltd., Suwon-si, Gyeonggi-do (KR)

(72) Inventors: Bonwon Koo, Suwon-si (KR); Deukseok Chung, Yongin-si (KR); Hyunjoon Kim, Seoul (KR); Shanghyeun Park, Yongin-si (KR); Changsoo Lee, Seoul (KR); Taewon Jeong, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 447 days.

(21) Appl. No.: 14/633,781

(22) Filed: Feb. 27, 2015

(65) Prior Publication Data
US 2016/0026060 A1  Jan. 28, 2016

(30) Foreign Application Priority Data
Jul. 24, 2014  (KR) ........................ 10-2014-0094161

(51) Int. Cl.
| *G02F 1/163* | (2006.01) |
|---|---|
| *G06F 3/041* | (2006.01) |
| *G09G 3/38* | (2006.01) |
| *G02F 1/1333* | (2006.01) |
| *G02F 1/133* | (2006.01) |

(52) U.S. Cl.
CPC ............ *G02F 1/163* (2013.01); *G06F 3/0412* (2013.01); *G09G 3/38* (2013.01); *G02F 1/13318* (2013.01); *G02F 1/13338* (2013.01); *G02F 2001/1635* (2013.01); *G09G 2310/08* (2013.01); *G09G 2354/00* (2013.01)

(58) Field of Classification Search
CPC ...... G06F 1/3218; G06F 3/0412; G06F 3/044; G09G 3/19; G09G 3/38
See application file for complete search history.

(56) References Cited

U.S. PATENT DOCUMENTS

| 6,861,788 B2 | 3/2005 | Li et al. |
|---|---|---|
| 7,379,243 B2 | 5/2008 | Horsten et al. |
| 7,679,808 B2 | 3/2010 | Kim |

(Continued)

FOREIGN PATENT DOCUMENTS

| JP | 2901489 B2 | 6/1999 |
|---|---|---|
| JP | 2004212782 A | 7/2004 |

(Continued)

*Primary Examiner* — Sepehr Azari
(74) *Attorney, Agent, or Firm* — Harness, Dickey & Pierce, P.L.C.

(57) ABSTRACT

An electro-chromic panel includes a detection layer, and an electro-chromic layer configured to switch an operational mode of a selected area according to a signal provided from the detection layer. A method of operating an electro-chromic panel includes detecting a first signal provided to a detection layer, and switching an operational mode of a first area of an electro-chromic layer according to the first signal provided from the detection layer.

24 Claims, 5 Drawing Sheets

(56) References Cited

U.S. PATENT DOCUMENTS

| | | | |
|---|---|---|---|
| 2008/0238871 A1* | 10/2008 | Tam | G02F 1/1533 345/158 |
| 2008/0284925 A1* | 11/2008 | Han | G06F 3/0425 349/12 |
| 2009/0262085 A1* | 10/2009 | Wassingbo | G06F 3/03547 345/173 |
| 2013/0307801 A1* | 11/2013 | Nam | G06F 3/041 345/173 |
| 2013/0328780 A1* | 12/2013 | Kuroki | G02B 6/0065 345/168 |
| 2014/0062899 A1* | 3/2014 | Lee | G06F 3/0416 345/173 |

FOREIGN PATENT DOCUMENTS

| | | |
|---|---|---|
| JP | 2009506928 A | 2/2009 |
| KR | 201994033187 | 8/1998 |

* cited by examiner

ELECTRO-CHROMIC PANEL CAPABLE OF SELECTIVELY MAKING TRANSPARENT AREA AND REFLECTIVE AREA AND METHOD OF OPERATING THE SAME, AND DISPLAY APPARATUS INCLUDING THE SAME AND METHOD OF OPERATING DISPLAY APPARATUS

CROSS REFERENCE TO RELATED APPLICATIONS

This application claims the benefit of Korean Patent Application No. 10-2014-0094161, filed on Jul. 24, 2014, in the Korean Intellectual Property Office, the disclosure of which is incorporated herein in its entirety by reference.

BACKGROUND

1. Field

Example embodiments relate to a display and an operation method thereof, for example, to an electro-chromic panel capable of selectively making a transparent and a reflective area and a method of operating the electro-chromic panel, and to a display apparatus including the electro-chromic panel and a method of operating the display apparatus.

2. Description of the Related Art

In a display of the related art, for example, a liquid crystal display (LCD), a half mirror may be attached on a surface for displaying an image. An image is displayed through the half mirror while the display is operated. When the display is not operated, that is, in an OFF state, the display functions as a mirror. When the display is attached in a partial area of the half mirror, a portion of the half mirror where the display is not attached may function as a mirror even while the display is operated. Accordingly, the half mirror may provide an image while functioning as a mirror. As another method of providing a mirror function with an image display function, a portion other than a portion that is used as a display in a display apparatus may be manufactured as a mirror.

SUMMARY

Example embodiments provide an electro-chromic panel that may selectively generate a transmission area and a reflective area.

Example embodiments provide a method of operating the electro-chromic panel.

Example embodiments provide a display apparatus that may include the electro-chromic panel and simultaneously embody an information display function and a reflection function (mirror function) in one display area.

Example embodiments provide a method of operating the display apparatus.

Additional aspects will be set forth in part in the description which follows and, in part, will be apparent from the description, or may be learned by practice of example embodiments.

According to example embodiments, an electro-chromic panel includes a detection layer, and an electro-chromic layer configured to switch an operational mode of a selected area according to a signal provided from the detection layer.

The detection layer may include a sensor configured to detect an externally provided signal.

The electro-chromic layer may include an array layer that is actively operated.

The array layer may include a transparent electrode and a switching element connected to the transparent electrode.

The electro-chromic layer may further include an ion storage layer, an electrolyte layer, a catalyst layer, and an active layer sequentially stacked on the array layer.

According to example embodiments, a method of operating an electro-chromic panel includes detecting a first signal provided to a detection layer, and switching an operational mode of a first area of an electro-chromic layer according to the first signal provided from the detection layer.

Detecting the first signal may include detecting a first touch signal provided to the detection layer.

Detecting the first signal may include detecting an optical signal provided to the detection layer.

The switching may include analyzing the first signal provided from the detection layer, selecting the first area to be mode switched from the electro-chromic layer, and switching the operational mode of the first area.

The method may further include detecting a second signal provided to the detection layer and switching an operation mode of a second area of the electro-chromic layer according to the second signal provided from the detection layer.

Detecting the first touch signal may include detecting a touch from an external object to the detection layer up to two times.

The first touch signal may determine a size of an area to be mode switched and is dragged in a touched state in a direction by a distance.

According to example embodiments, a display apparatus includes an electro-chromic panel configured to switch an operational mode of an area selected according to an external signal, and a display panel configured to provide information displayed through the electro-chromic panel.

The electro-chromic panel may include a detection layer including a sensor, and an electro-chromic layer including an array layer arranged therein, the array layer including a transparent electrode and a switching element connected to the transparent electrode.

The display panel may include a readout integrated circuit (IC) configured to read the external signal, a processor configured to analyze the external signal transmitted from the readout IC, a timing controller configured to receive a signal about one of information and an image to be displayed from the processor and perform timing control of the signal, and a display driver integrated circuit (DDIC) configured to convert the timing-controlled signal output from the timing controller to a drive voltage of the display panel and transmit the drive voltage to the display panel.

The display apparatus may further include a motion detection sensor configured to detect a motion of an external object and transmit the detected data to the processor.

According to example embodiments, a method of operating a display apparatus includes detecting a first signal provided to an electro-chromic panel, operating a first area of a display panel by analyzing the first signal, and operating a first area of the electro-chromic panel corresponding to the first area of the display panel.

The signal may be one of a touch signal and an optical signal.

Operating the first area of the display panel may include turning the first area on or off.

Operating the first area of the electro-chromic panel may include operating the first area of the electro-chromic panel in one of a transmission mode and a reflective mode.

The method may further include detecting a second signal provided to the electro-chromic panel, operating a second area of the display panel by analyzing the second signal, and operating a second area of the electro-chromic panel corresponding to the second area of the display panel.

The first and second signals may be simultaneously provided to the electro-chromic panel.

The first and second signals may be motion detection signals configured to detect a motion of an external object, information displayed through the second area of the electro-chromic panel may be the same as information displayed through the first area of the electro-chromic panel, and the first area of the electro-chromic panel may be operated in a reflective mode when the information is displayed through the second area of the electro-chromic panel. The method may further include operating at least one area in addition to the first area of the display panel, and operating at least one area in addition to the first area of the electro-chromic panel corresponding to the at least one area of the display panel.

The first signal may be a drag signal that determines a size of the first area of the electro-chromic panel.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. In the drawings, the thicknesses of layers and regions are exaggerated for clarity. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1:
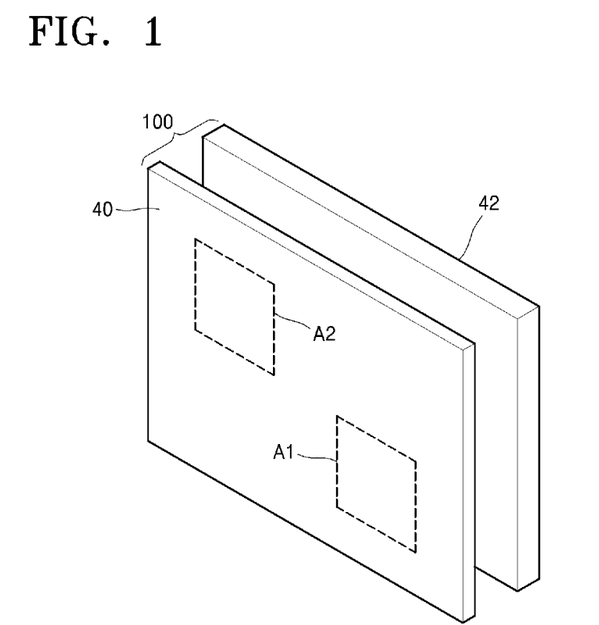
FIG. 1 is a perspective view illustrating an electro-chromic panel according to example embodiments.
Figure 2:
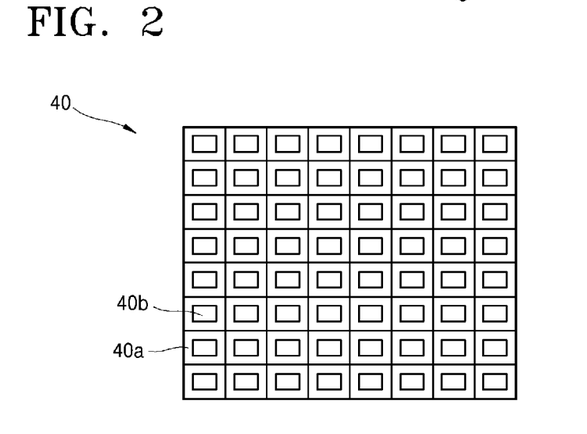
FIG. 2 is a plan view of a detection layer of the electro-chromic panel of FIG. 1.

Referring to FIG. 1, an electro-chromic panel 100 may include a detection layer 40 and an electro-chromic layer 42. The detection layer 40 is a transparent layer. The detection layer 40 detects a wireless signal or a touch signal. To this end, the detection layer 40 may include a plurality of detection areas 40a as illustrated in FIG. 2. The detection areas 40a form an array. Each of the detection areas 40a may include a sensor 40b. The sensor 40b may be a touch sensor and/or wireless signal detection sensor. The wireless signal detection sensor may be an optical sensor, for example, an infrared sensor. The electro-chromic layer 42 may operate in a transmission mode (or transparent mode) or a reflective mode (or mirror mode) according to a voltage applied to a transparent electrode. The electro-chromic layer 42 may be driven in an active method. An example of the electro-chromic layer 42 is illustrated in FIG. 3.

Figure 3:
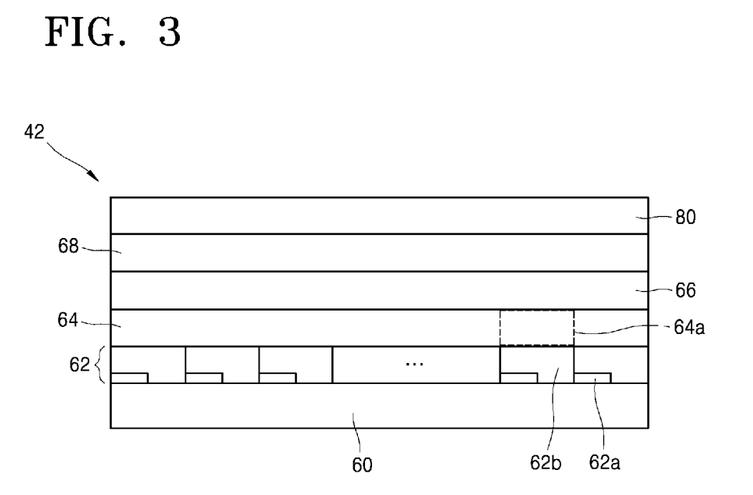
FIG. 3 is a cross-sectional view of the electro-chromic layer of the electro-chromic panel of FIG. 1.
Figure 4:
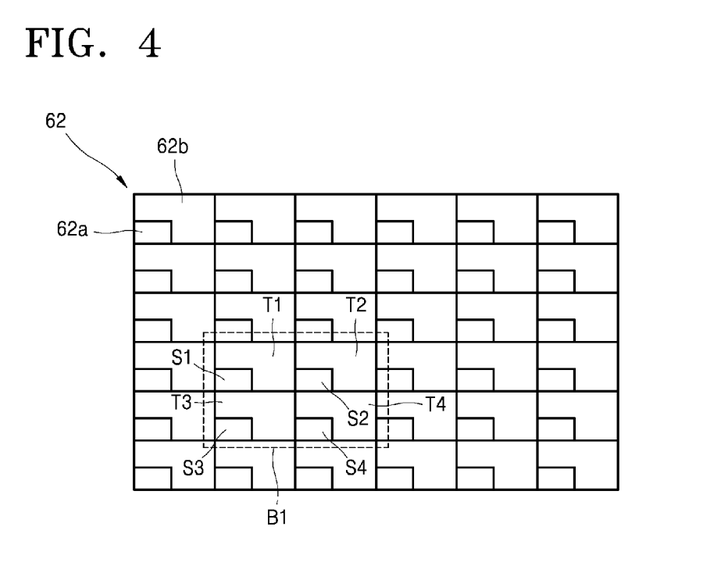
FIG. 4 is a plan view of an array layer of FIG. 3.

Referring to FIG. 3, the electro-chromic layer 42 has a structure in which an array layer 62, an ion storage layer 64, an electrolyte layer 66, a catalyst layer 68, and an active layer 80 are sequentially stacked on a base substrate 60. The base substrate 60 may be a glass substrate or a transparent plastic substrate. The transparent plastic substrate may include any material selected from a group consisting of polyethersulphone (PES), polyacrylate (PAR), polyetherimide (PEI), polyethyelenennapthalate (PEN), polyethyelene-terepthalate (PET), polyphenylene sulfide (PPS), polyally-late, polyimide, polycarbonate (PC), cellulose triacetate (TAC), and cellulose acetate propinonate (CAP). The array layer 62 may be a transparent layer with respect to light. The array layer 62 may include a plurality of switching elements 62a and a plurality of transparent electrodes 62b. The switching elements 62a may be, for example, a thin film transistor (TFT) array. The switching elements 62a and the transparent electrodes 62b have a one-to-one correspondence and are connected to each other. The switching elements 62a and the transparent electrodes 62b form an array as illustrated in FIG. 4. One of the switching elements 62a is connected to each of the transparent electrodes 62b. Accordingly, one of the transparent electrodes 62b is selected by selecting one of the switching elements 62a. A mode switching voltage may be applied to one of the transparent electrodes 62b through a selected one of the switching element 62a. Accordingly, the mode of an area corresponding to the selected one of the transparent electrodes 62b of the electro-chromic layer 42 may be switched from the reflective mode to the transmission mode or vice versa.

The transparent electrodes 62b may be, for example, an ITO film or another transparent conductive oxide film that is equivalent or similar to the ITO film may be provided instead of the ITO film. The ion storage layer 64 stores hydrogen ions needed for generating electro-chrome. The ion storage layer 64 may be, for example, a tungsten oxide (WOx) film. When a positive (+) voltage is applied to a selected one of the transparent electrodes 62b, hydrogen ions (protons) included in an area 64a of the ion storage layer 64 corresponding to the selected one of the transparent electrodes 62b are moved above the ion storage layer 64 to arrive at the active layer 80 via the electrolyte layer 66 and the catalyst layer 68. Accordingly, the ion storage layer 64 and the active layer 80 are in a transparent state. Reversely, when a negative (−) voltage is applied to the selected one of the transparent electrodes 62b, hydrogen ions at the active layer 80 are moved to the ion storage layer 64. As a result, the active layer 80 returns to metal intrinsic properties. The ion storage layer 64 is in a deep blue state again due to the hydrogen ions and is colored to be opaque. In the latter case, the electro-chromic layer 42 functions as a mirror. The electro-chromic layer 42 may be actively controlled. Accordingly, the entire area of the electro-chromic layer 42 may be used in the transmission mode or the reflective mode. However, a selected area and the other area of the electro-chromic layer 42 may be operated in different modes. This point is described later.

The electrolyte layer 66 may be, for example, a TaOx film or a SnInPOx film. The catalyst layer 68 may be a layer including any one selected from a group consisting of Pd, Pt, and Au. As the catalyst layer 68 exists, a reaction between the hydrogen ions supplied from the ion storage layer 64 and the active layer 80 may be facilitated when a voltage is applied to use the electro-chromic layer 42 in a transmission mode. Also, the catalyst layer 68 enables uniform occurrence of the reaction in the entire area of the active layer 80.

The active layer 80 may be a layer including at least two elements selected from a group consisting of Mg, Y, Ni, Ca, Gd, Sm, and Er. The material of the active layer 80 may be an alloy material that may be in a transparent state by being combined with the hydrogen ions supplied from the ion storage layer 64. The active layer 80 is formed of an alloy and functions as an upper electrode. The active layer 80 may be a common electrode.

A method of operating an electro-chromic panel according to example embodiments is described with reference to FIGS. 1 and 4. In the array layer 62 of FIG. 4, a first area B1 is regarded as a selected area. The first area B1 is operated in a transmission mode and the other area except for the first area B1 is operated in a reflective mode.

The first area B1 includes first to fourth switching elements S1-S4 and first to fourth transparent electrodes T1-T4. Five or more switching elements and transparent electrodes may be included in the first area B1. Because the first area B1 is a freely selected area, the size of the first area B1 may be larger or smaller than the illustrated size. Also, at least one area may be simultaneously selected with the first area B1 in the array layer 62. The at least one area may be separated from or adjacent to the first area B1. The size of the at least one area may be identical to or different from the size of the first area B1.

A positive voltage is applied to the first to fourth transparent electrodes T1-T4 by turning on the first to fourth switching elements S1-S4 of the first area B1 of the array layer 62. The active layer 80 may be used as a common electrode. The application of a voltage triggers emission of the hydrogen ions from a given (or alternatively, predetermined) area of the ion storage layer 64 corresponding to the first area B1 of the array layer 62 toward the active layer 80. The emitted hydrogen ions pass through the electrolyte layer 66 and the catalyst layer 68 to react with the active layer 80. As a result, the ion storage layer 64 and the active layer 80 are in a transparent state with respect to incident light and thus a portion corresponding to the first area B1 of the array layer 62 in the electro-chromic layer 42 becomes transparent. Accordingly, a first area A1 of the electro-chromic panel 100 of FIG. 1 corresponding to the first area B1 of the array layer 62 becomes transparent, whereas the other area becomes opaque. In other words, the first area A1 in the electro-chromic panel 100 is operated in the transmission mode and the other area is operated in the reflective mode. After the first area B1 is operated in the transmission mode, the first area B1 continuously retains the transmission mode without the application of a voltage. Accordingly, no voltage is applied to the first to fourth transparent electrodes T1-T4 until the mode of the first area B1 is switched.

Two or more areas may be simultaneously operated in the transmission mode by applying the method of operating the first area B1 in the transmission mode to other selected area of the array layer 62, for example, an area corresponding to a second area A2 of the detection layer 40.

The first to fourth switching elements S1-S4 of the first area B1 are turned on and a negative voltage is applied to the first to fourth transparent electrodes T1-T4. The active layer 80 may be used as a common electrode. The application of a voltage triggers emission of the hydrogen ions from a given (or alternatively, predetermined) area of the active layer 80 corresponding to the first area B1 of the array layer 62 toward an area of the ion storage layer 64 corresponding thereto. As a result, the ion storage layer 64 and the active layer 80 are in an opaque state and thus a portion corresponding to the first area B1 of the array layer 62 in the electro-chromic layer 42 becomes opaque. Accordingly, the first area A1 of the electro-chromic panel 100 of FIG. 1 corresponding to the first area B1 of the array layer 62 becomes opaque. In other words, the first area A1 in the electro-chromic panel 100 is operated in the reflective mode (mirror mode). After the first area A1 is operated in the reflective mode, the first area A1 continuously retains the reflective mode without the application of a voltage. Accordingly, no voltage is applied to the first to fourth transparent electrodes T1-T4 until the mode of the first area A1 is switched.

The method of operating the first area A1 of the electro-chromic panel 100 in the reflective mode may be applied to the second area A2 of the electro-chromic panel 100. Thus, two or more areas may be simultaneously operated in the reflective mode in the electro-chromic panel 100.

On the other hand, the first area B1 of the array layer 62 may correspond to the first area A1 of the detection layer 40 of FIG. 1. Accordingly, a mode switching operation with respect to the first area B1 of the array layer 62 may be performed by touching the first area A1 of the detection layer 40 or irradiating light toward the first area A1. For example, the mode of the first area B1 may be switched from the reflective mode to the transmission mode or vice versa whenever the first area A1 of the detection layer 40 is touched once by using a touch device. Alternatively, the mode of the first area B1 of the array layer 62 may be switched whenever a light beam of a particular wavelength is irradiated toward the first area A1 of the detection layer 40 by using a remote controller.

As such, when a touch signal or optical signal is received in a given (or alternatively, predetermined) area of the detection layer 40, for example, the first and/or second areas A1 and/or A2, as a given (or alternatively, predetermined) area of the array layer 62 corresponding to the given (or alternatively, predetermined) area of the detection layer 40 is set to interact, the mode of the selected area A1 or A2 of the electro-chromic panel 100 may be freely switched. In this process, a touch method with respect to the first area A1 of the detection layer 40 and a reaction according thereto may appear differently from each other. For example, when a touch time interval for the first area A1 of the detection layer 40 is longer than a set time, for example, one second, the mode of the first area A1 is switched, and when the touch time interval is shorter than the set time, for example, continuously touching twice at an interval shorter than one second, an operation of extending a boundary of the first area A1 without a change in the mode may be set to be performed.

A display apparatus 200 including the electro-chromic panel according to example embodiments is described below.

Figure 5:
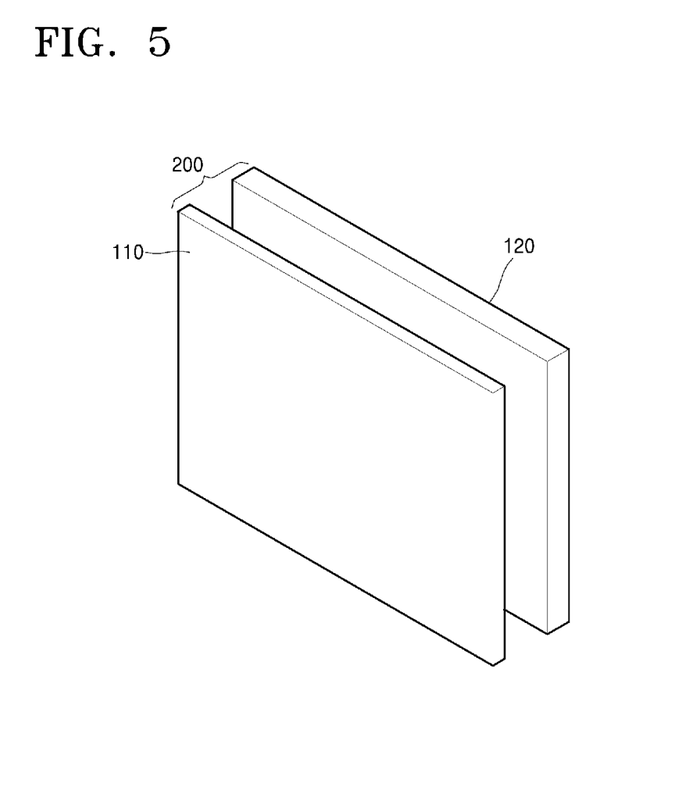
FIG. 5 is a perspective view of a display apparatus including an electro-chromic panel, according to example embodiments.

Referring to FIG. 5, the display apparatus 200 may include an electro-chromic panel 110 and a display panel 120. The electro-chromic panel 110 may be the electro-chromic panel 100 of FIG. 1. The display panel 120 may be a flat type display panel, for example, LCD, OLED, PDP, or QD. The electro-chromic panel 110 may be located in front of the display panel 120, that is, at a side facing a viewer. The foremost surface of the electro-chromic panel 110 may be the detection layer 40 of FIG. 1. Accordingly, transmitting a touch signal or a wireless signal to the display apparatus 200 may denote touching a given (or alternatively, predetermined) area of the foremost surface (detection layer) of the electro-chromic panel 110 or transmitting a wireless signal, for example, an optical signal, to the given (or alternatively, predetermined) area of the foremost surface by using a remote controller.

A method of operating the display apparatus 200 of FIG. 5 is described below.

A process of displaying information in the first area A11 (see FIGS. 6 and 7) of the electro-chromic panel 110 is described as an example. The position of the first area A11 is unspecified (optional). Accordingly, the first area A11 may be located in any area of the foremost surface (detection layer) of the electro-chromic panel 110. Also, the size of the first area A11 may be larger or smaller than the illustrated size. Also, in addition to the first area A11, at least one second area that is used as an information display area may be further set in the foremost surface of the electro-chromic panel 110. Also, the display panel 120 is assumed to display information. However, the information display of the display panel 120, that is, the operation of the display panel 120, may start when a signal of a preset type is detected from the foremost surface of the electro-chromic panel 110. For example, when the first area A11 of electro-chromic panel 110 is directly touched by a touch means, for example, a finger or a touch pen, or receives a particular optical signal, the display panel 120 may be operated to provide information that is displayed through the first area A11.

Figure 6:
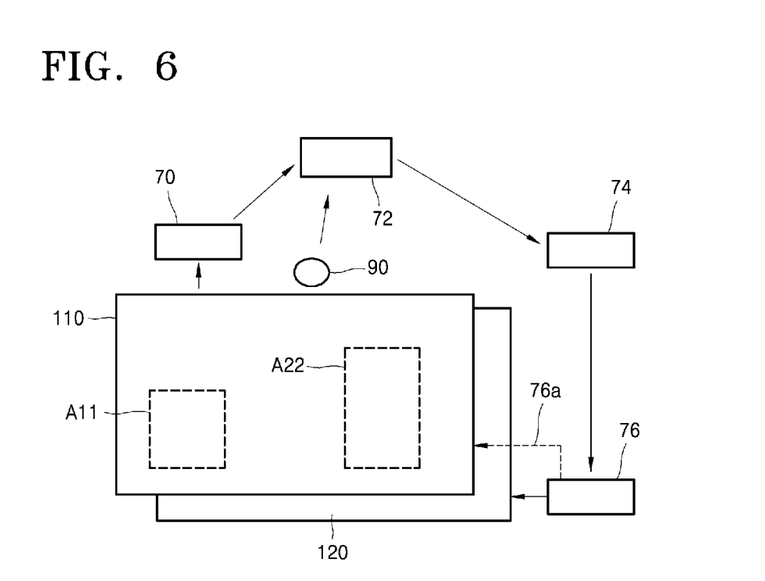
FIG. 6 is a block diagram showing a method of operating a display apparatus according to example embodiments.

Referring to FIG. 6, when an operational signal, for example, a touch signal, is provided to the first area A11 (the operational signal may be provided outside the first area A11), the operational signal is read by a readout integrated circuit (IC) 70 and transferred to a processor 72. The processor 72 analyzes the operational signal and determines whether the operational signal is an operational mode switching signal of the first area A11. When the operational signal is determined to be an operational mode switching signal of the first area A11 as a result of the determination of the operational signal, the operational mode of the first area A11 is switched to a different mode from a current operational mode. Otherwise, the operational mode of the first area A11 is maintained. When the operational signal is determined to be a signal requesting other operation that is not related to the operational mode switching of the first area A11, for example, a signal requesting a change in the size of the first area A11, as a result of the analysis of the operational signal, a corresponding operation may be performed.

For convenience of explanation, the operational signal is assumed to be a signal requesting a change in the operational mode of the first area A11, for example, switching from the reflective mode to the transmission mode (information display mode).

The processor 72 transmits to a timing controller 74 data about an information signal, for example, an image signal, to be displayed in a given (or alternatively, predetermined) area of the display panel 120 corresponding to the first area A11, according to a result of the analysis of the operational signal. When information is displayed in the given (or alternatively, predetermined) area of the display panel 120 corresponding to an area other than the first area A11, for example, the second area A22, the processor 72 may transmit to the timing controller 74 data about the position and size of the given (or alternatively, predetermined) area of the display panel 120 corresponding to the second area A22 with information data to be displayed. The timing controller 74 that controls a display signal performs timing control on a display signal for information to a signal suitable for the display panel 120 where information is to be displayed and outputs a timing controlled signal to a display driver integrated circuit (DDIC) 76. The DDIC 76 converts the signal output from the timing controller 74 to data about a drive voltage of the display panel 120 where information is to be displayed and transmits the data to the display panel 120. The display panel 120 displays the information in the given (or alternatively, predetermined) area of the display panel 120 corresponding to the first area A11 of electro-chromic panel 110, according to the data provided by the DDIC 76.

As such, during a process of displaying information in the given (or alternatively, predetermined) area of the display panel 120, an operation of switching the mode of the first area A11 of the electro-chromic panel 110 from the reflective mode to the transmission mode may be performed. The switching operation may be performed by, for example, a signal 76a transmitted from the DDIC 76 to the electro-chromic panel 110. The signal 76a may be applied to the electro-chromic panel 110 only when the mode switching of a partial area or the entire area of the electro-chromic panel 110 is needed and may not be applied after the mode switching is carried out. The operation of the DDIC 76 may be controlled by the processor 72.

As such, in the display apparatus 200, information is displayed through the first area A11 of electro-chromic panel 110 and the other area except for the first area A11 may be operated in the reflective mode. Accordingly, while the information is viewed through the first area A11 of electro-chromic panel 110, the other area may be used as a mirror. In the display apparatus 200, the readout IC 70, the processor 72, the timing controller 74, and the DDIC 76 may be included in the display panel 120. For example, like a typical display panel, the readout IC 70, the processor 72, the timing controller 74, and the DDIC 76 may be provided in a peripheral circuit portion (not shown) of the display panel 120.

On the other hand, while the information is viewed through the first area A11, it may be considered to view second information through at least one of other areas, for example, the second area A22, of the electro-chromic panel 110. A process of displaying the second information may be performed in the second area A22 while the information display in the first area A11 is maintained. The process may be performed based on the information display process with respect to the first area A11. The second information may be identical to or different from the information displayed in the first area A11. For example, when information about a current event channel is displayed in the first area A11, information about a movie channel or a sport channel may be displayed in the second area A22. The operational signal may be a signal that operates both of the first and second areas A11 and A22 of the electro-chromic panel 110 and the areas of the display panel 120 corresponding to the first and second areas A11 and A22. Accordingly, different information may be simultaneously displayed in the first and second areas A11 and A22 by applying once the operation signal, for example, a touch signal, to the electro-chromic panel 110. When the first information is displayed in the first area A11 by applying a first operational signal, for example, a first touch signal, to the electro-chromic panel 110 and the second information is displayed in the second area A22 by applying a second operational signal, for example, a second touch signal, to the electro-chromic panel 110, the first and second operational signal may be simultaneously or sequentially applied to the electro-chromic panel 110.

On the other hand, while the first area A11 of the electro-chromic panel 110 is maintained in the transmission mode and the display panel 120 is in an off state, the first area A11 of the electro-chromic panel 110 or other area may be touched. In this case, as the display panel 120 is turned on, operational conditions may be set such that information is displayed in the first area A11 of the electro-chromic panel 110. In other words, when an area of the electro-chromic panel 110 is touched in a state in which the display panel 120 is off, the operational conditions may be set such that the order of areas for displaying the information provided from the display panel 120 is 1) an area operating in the transmission mode of the electro-chromic panel 110 and 2) a touched area of the electro-chromic panel 110, which is an area different from the first area A11.

In an additional description of the operational signal applied to the electro-chromic panel 110 and a result of the operation according thereto, when the first area A11 is maintained in the transmission mode and the operational signal applied to the first area A11 is two consecutive touch signals that are shorter than a given (or alternatively, predetermined) time interval, the operational signal may be set to be an operational signal that switches the mode of the first area A11 of the electro-chromic panel 110 from the transmission mode to the reflective mode. However, the operational signal may be set to be an operational signal that switches the mode of the first area A11 from the reflective mode to the transmission mode.

In another case, touching the first area A11 that displays information once may be considered as an operational signal to change the channel of the information displayed in the first area A11. In this case, when the first area A11 is touched over a given (or alternatively, predetermined) time interval, for example, one second or more, information about a different channel may be displayed in the first area A11 whenever touched. Also, when the first area A11 that displays information in the electro-chromic panel 110 is dragged to another area in a touched state, the display apparatus 200 may be operated so as to display the information displayed in the first area A11 in the dragged area (hereinafter, referred to the drag operation). In other words, the first area A11 may be moved to another area by the drag operation. Also, when different pieces of information are displayed in the first and second areas A11 and A22 and any one area, for example, the first area A11, is dragged to another area, for example, the second area A22, the display apparatus 200 may be operated such that the first area A11 disappears (is switched to the reflective mode) and the second area A22 displays the information that was displayed in the first area A11.

The drag operation may be applied to other operations. It is assumed that the first area A11 is in the transmission mode and the first area A11 displays information.

Figure 7:
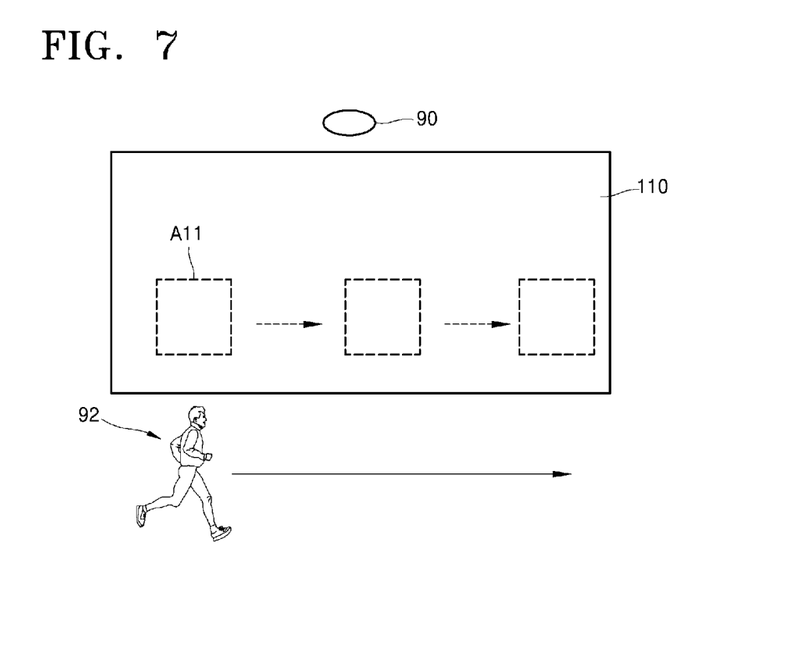
FIG. 7 is a plan view illustrating a case in which an information display area is moved according to a movement of an external moving object, for example, a viewer, in a method of operating a display apparatus according to example embodiments.

For example, as illustrated in FIG. 7, when an external object 92 that moves, for example, a viewer, moves from the left to the right, a motion detection sensor 90 detects a movement and a movement direction of the external object 92 and transmits data of the detection to the processor 72 in real time. The processor 72 analyzes the data from the motion detection sensor 90 and transmits data about the position of the external object 92 with data about the information to be displayed, to the timing controller 74 in real time. Accordingly, the same information as the information displayed in the first area A11 is moved along the external object 92 in real time. When the information is displayed in an area at the right side of the first area A11, the first area A11 may be operated in the reflective mode. The motion detection sensor 90 may be provided at an edge of the display apparatus 200, for example, at the edge of the electro-chromic panel 110.

<Reflective Mode Operation>

The reflective mode may be performed when the display panel 120 is in an off state. When the display panel 120 is off, no information is provided by the display panel 120 and thus the entire area of the electro-chromic panel 110 may be operated in the reflective mode. The reflective mode operation of the electro-chromic panel 110 may be performed in the method described with reference to FIG. 4. As the display panel 120 and the electro-chromic panel 110 are engaged with each other, when the display panel 120 is turned off, the entire area of the electro-chromic panel 110 is switched to the reflective mode. When the display panel 120 is turned on, at least a partial area of the electro-chromic panel 110 is switched to the transmission mode.

Figure 8:
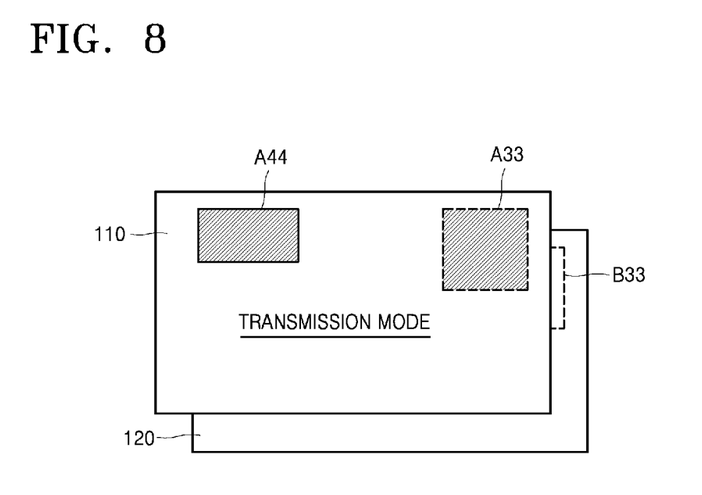
FIG. 8 illustrates a case in which an operation mode of a partial area of a display apparatus according to example embodiments is switched to a reflective mode (mirror mode)

On the other hand, as illustrated in FIG. 8, in a state in which information is displayed in the entire area of the electro-chromic panel 110, when a partial area, for example, a third area A33, is switched to the reflective mode, an information signal, for example, an image signal, applied to a third area B33 of the display panel 120 corresponding to the third area A33 is blocked. Also, the operational mode of the third area A33 is switched from the transmission mode to the reflective mode by applying a voltage to the third area A33 of the electro-chromic panel 110. The blocking operation of the information signal applied to the third area B33 of the display panel 120 may be performed by the processor 72, the timing controller 74, and the DDIC 76. The operational mode switching of the third area A33 of the electro-chromic panel 110 and the blocking operation of the information signal applied to the third area B33 of the display panel 120 may be simultaneously performed by being engaged with each other. For example, when a signal, for example, a touch signal or an optical signal, requesting mode switching, for example, from the transmission mode to the reflective mode, of the third area A33 is detected from a given (or alternatively, predetermined) area of the electro-chromic panel 110, the blocking of the information signal applied to the third area B33 is performed in the display panel 120 through the processor 72, the timing controller 74, and the DDIC 76 according to the signal. Simultaneously, a signal for mode switching of the third area A33 is applied from the DDIC 76 to the electro-chromic panel 110 and thus the mode of the third area A33 is switched from the transmission mode to the reflective mode. Therefore, while the third area A33 in the electro-chromic panel 110 may be used as a mirror, information may be viewed through the other area.

A case in which, in addition to the third area A33, at least one area, for example, the fourth area A44, in the electro-chromic panel 110 may be further switched to the reflective mode may be considered. The fourth area A44 may be switched simultaneously with the third area A33 or after the third area A33 is switched. The mode switching of the fourth area A44 may be performed in the same manner as the mode switching of the third area A33.

When the mode switching of the third area A33 and/or the fourth area A44 is temporary in the reflective mode operation, that is, the third area A33 and/or the fourth area A44 is used in the reflective mode for a time being and then the third area A33 and/or the fourth area A44 is shortly switched back to the transmission mode, the information signal blocking operation with respect to the third area B33 of the display panel 120 and/or a given (or alternatively, predetermined) area of the display panel 120 corresponding to the fourth area A44 of the electro-chromic panel 110 may not be performed. In other words, regardless of the third area A33 and/or the fourth area A44 being switched to the reflective mode, information may be continuously displayed in the third area B33 of the display panel 120 and/or the given (or alternatively, predetermined) area of the display panel 120 corresponding to the fourth area A44 of the electro-chromic panel 110.

The operation of requesting mode switching on a selected area, for example, the third area A33, of the electro-chromic panel 110 may be a motion of touching the selected area one or more times, for example, once or twice in sequence, or a motion of irradiating an optical signal to the selected area in a specific manner.

On the other hand, the area to be mode switched and the size of the area may be determined by a user in the transmission mode operation or the reflective mode operation.

Figure 9:
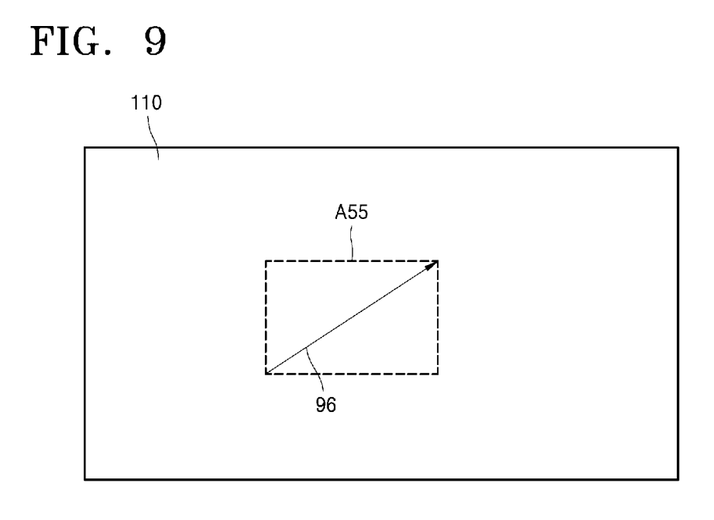
FIG. 9 is a plan view illustrating a case in which a user determines the size of an area, mode of which is to be switched, in a display apparatus according to example embodiments.

Referring to FIG. 9, when a user touches a part of the electro-chromic panel 110 and moves in a direction indicated by an arrow 96 by the length of the arrow 96, an area to be mode switched may be a fifth area A55. The operation may be included in an operational program in a manufacturing process of the display apparatus 200. If the touch is for the transmission mode, the fifth area A55 may be switched to the transmission mode. If the touch is for the reflective mode, the fifth area A55 may be switched to the reflective mode.

As described above, according to example embodiments, the display apparatus that selectively embodies both of an information display function and a reflection function (mirror function) according to example embodiments may include an electro-chromic panel and a display panel. The electro-chromic panel includes an electro-chromic layer (electro-chromic mirror). The entire area of the electro-chromic layer may include a transmission mode (transmission area) or a reflective mode (reflective area). Also, in the electro-chromic layer, a partial area may be adjusted to be a transmission area and the other area may be adjusted to be a reflective area. The positions and sizes of the transmission area and the reflective area may be freely selected. A particular area in the electro-chromic panel becomes a transmission area or a reflective area according to an applied voltage.

As such, a certain area of the electro-chromic panel may be determined to be a transmission area or a reflective area and the position or size of the certain area may be freely set and information displayed in the display apparatus may be variously designed. Accordingly, the display apparatus may be operated at a variety of positions according to the purpose of use. Also, the structure and operation of the exampled display apparatus may be applied not only to a middle or large display apparatus based on an LCD or OLED but also to a mobile display apparatus.

On the other hand, a given (or alternatively, predetermined) area in the electro-chromic panel may be freely switched to a transmission area or a reflective area. The electro-chromic panel may be applied to a variety of fields, for example, buildings, or smart windows or digital partitions of vehicles, so as to be used as an electronic curtain or a selective auxiliary window.

It should be understood that the exemplary embodiments described herein should be considered in a descriptive sense only and not for purposes of limitation. Descriptions of features or aspects within each embodiment should typically be considered as available for other similar features or aspects in other embodiments.

While example embodiments have been described with reference to the figures, it will be understood by those of ordinary skill in the art that various changes in form and details may be made therein without departing from the spirit and scope of the following claims.

What is claimed is:

1. An electro-chromic panel comprising:
   a detection layer; and
   an electro-chromic layer configured to switch an operational mode of a selected area between a transmission mode and a reflective mode according to a signal provided from the detection layer.

2. The electro-chromic panel of claim 1, wherein the detection layer includes a sensor configured to detect an externally provided signal.

3. The electro-chromic panel of claim 1, wherein the electro-chromic layer includes an array layer that is actively operated.

4. The electro-chromic panel of claim 3, wherein the array layer includes
   a transparent electrode, and
   a switching element connected to the transparent electrode.

5. The electro-chromic panel of claim 3, wherein the electro-chromic layer further comprises an ion storage layer, an electrolyte layer, a catalyst layer, and an active layer sequentially stacked on the array layer.

6. A method of operating an electro-chromic panel, the method comprising:
   detecting a first signal provided to a detection layer; and
   switching an operational mode of a first area of an electro-chromic layer between a transmission mode and a reflective mode according to the first signal provided from the detection layer.

7. The method of claim 6, wherein the detecting detects a first touch signal provided to the detection layer.

8. The method of claim 7, wherein the detecting a first touch signal includes detecting a touch from an external object to the detection layer up to two times.

9. The method of claim 7, wherein the detecting a first touch signal determines a size of an area to be mode switched and is dragged in a touched state in a direction by a distance.

10. The method of claim 6, wherein the detecting detects an optical signal provided to the detection layer.

11. The method of claim 6, wherein the switching comprises:
    analyzing the first signal provided from the detection layer;
    selecting the first area to be mode switched from the electro-chromic layer; and
    switching the operational mode of the first area.

12. The method of claim 6, further comprising:
    detecting a second signal provided to the detection layer; and
    switching an operation mode of a second area of the electro-chromic layer according to the second signal provided from the detection layer.

13. A display apparatus comprising:
    an electro-chromic panel configured to switch an operational mode of a selected area between a transmission mode and a reflective mode according to an external signal; and
    a display panel configured to display information to be shown through the electro-chromic panel,
    wherein the display panel does not include the electro-chromic panel.

14. The display apparatus of claim 13, wherein the electro-chromic panel comprises
    a detection layer including a sensor, and
    an electro-chromic layer including an array layer arranged therein, the array layer including,
        a transparent electrode, and
        a switching element connected to the transparent electrode.

15. The display apparatus of claim 13, wherein the display panel comprises:
    a readout integrated circuit (IC) configured to read the external signal;
    a processor configured to analyze the external signal transmitted from the readout IC;
    a timing controller configured to receive a signal about one of information and an image to be displayed from the processor and perform timing control of the signal; and
    a display driver integrated circuit (DDIC) configured to convert the timing-controlled signal output from the timing controller to a drive voltage of the display panel and transmit the drive voltage to the display panel.

16. The display apparatus of claim 15, further comprising:
    a motion detection sensor configured to detect a motion of an external object and transmit the detected data to the processor.

17. A method of operating a display apparatus, the method comprising:
    detecting a first signal provided to an electro-chromic panel;
    operating a first area of a display panel by analyzing the first signal; and
    operating a first area of the electro-chromic panel corresponding to the first area of the display panel,
    wherein the operating a first area of the electro-chromic panel includes switching the first area of the electro-chromic panel between a transmission mode and a reflective mode.

18. The method of claim 17, wherein the detecting detects one of a touch signal and an optical signal.

19. The method of claim 17, wherein the operating a first area of the display panel includes turning the first area on or off.

20. The method of claim 17, further comprising:
detecting a second signal provided to the electro-chromic panel;
operating a second area of the display panel by analyzing the second signal; and
operating a second area of the electro-chromic panel corresponding to the second area of the display panel.

21. The method of claim 20, wherein the first and second signals are simultaneously provided to the electro-chromic panel.

22. The method of claim 20, wherein
the first and second signals are motion detection signals configured to detect a motion of an external object,
information displayed through the second area of the electro-chromic panel is the same as information displayed through the first area of the electro-chromic panel, and
the first area of the electro-chromic panel is operated in a reflective mode when the information is displayed through the second area of the electro-chromic panel.

23. The method of claim 17, further comprising:
operating at least one area in addition to the first area of the display panel; and
operating at least one area in addition to the first area of the electro-chromic panel corresponding to the at least one area of the display panel.

24. The method of claim 17, wherein the detecting detects a drag signal that determines a size of the first area of the electro-chromic panel.

* * * * *